(12) United States Patent
Wikander et al.

(10) Patent No.: US 8,634,183 B2
(45) Date of Patent: Jan. 21, 2014

(54) AUTOMATIC HINGE OPENING ASSEMBLY FOR ELECTRONIC DEVICE

(75) Inventors: Jered H. Wikander, Portland, OR (US); Shawn S. Mceuen, Portland, OR (US); Mark MacDonald, Beaverton, OR (US); Robert W. Wolcott, Newberg, OR (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 12/976,440

(22) Filed: Dec. 22, 2010

(65) Prior Publication Data

US 2012/0162864 A1   Jun. 28, 2012

(51) Int. Cl.
*E05F 1/08* (2006.01)
*H05K 7/00* (2006.01)
*H02K 7/00* (2006.01)
*E05D 11/10* (2006.01)

(52) U.S. Cl.
USPC ............ 361/679.01; 361/679.27; 361/679.46; 361/679.55

(58) Field of Classification Search
USPC .................................................. 361/679.01
See application file for complete search history.

(56) References Cited

U.S. PATENT DOCUMENTS

| | | | | |
|---|---|---|---|---|
| 5,500,982 | A * | 3/1996 | Hosoi | 16/297 |
| 6,263,542 | B1 * | 7/2001 | Larson et al. | 16/321 |
| 2002/0124351 | A1 * | 9/2002 | Lowry et al. | 16/273 |
| 2004/0154130 | A1 * | 8/2004 | Lee et al. | 16/330 |
| 2005/0050683 | A1 | 3/2005 | Tonogai | |
| 2006/0026798 | A1 * | 2/2006 | Gerali | 16/382 |
| 2006/0225248 | A1 | 10/2006 | Ishiwata | |
| 2006/0236504 | A1 | 10/2006 | Lu et al. | |
| 2009/0106939 | A1 | 4/2009 | Chang | |
| 2009/0293561 | A1 * | 12/2009 | Jakobsen et al. | 70/276 |

FOREIGN PATENT DOCUMENTS

| | | |
|---|---|---|
| WO | 2012/087765 A2 | 6/2012 |
| WO | 2012/087765 A3 | 11/2012 |

OTHER PUBLICATIONS

International Search Report and Written Opinion Received for PCT Application No. PCT/US2011/065270, mailed on Jul. 31, 2012, 9 pages.
Office Action Received for Chinese Patent Application No. 201120579432.4, mailed on Jun. 8, 2012, 2 pages of Office Action and 3 pages of English Translation.
International Preliminary Report on Patentability and Written Opinion received for PCT Patent Application No. PCT/US2011/065270, mailed on Jul. 4, 2013, 6 pages.

* cited by examiner

*Primary Examiner* — Tuan T Dinh
*Assistant Examiner* — Mukund G Patel
(74) *Attorney, Agent, or Firm* — Caven & Aghevli LLC

(57) ABSTRACT

In one embodiment an electronic device comprises a housing having a first section comprising a display and a second section comprising a keyboard coupled to the first section by a hinge assembly and an automatic hinge opening assembly for the housing. The automat hinge opening assembly comprises a hinge pin assembly mountable to the first section of the housing of the electronic device a pin rotatable about an axis between a first position and a second position and a hinge plate coupled to the pin and connectable to a hinge which connects the first section of the housing to a second section of the housing, and at least one torsion member coupled to the pin to apply a torque to the pin, wherein the torsion member is to store potential energy when the first section of the housing and the second section of the housing are in a closed position. Other embodiments may be described.

18 Claims, 5 Drawing Sheets

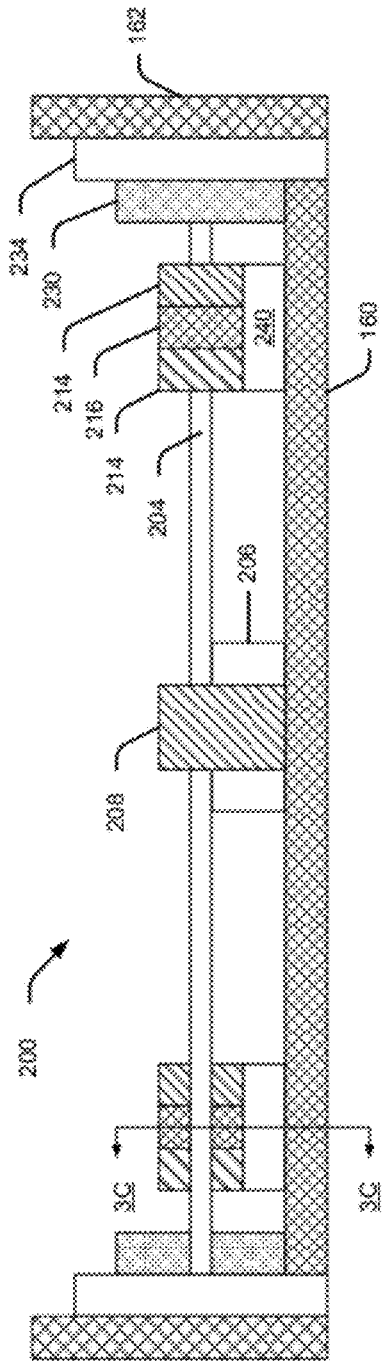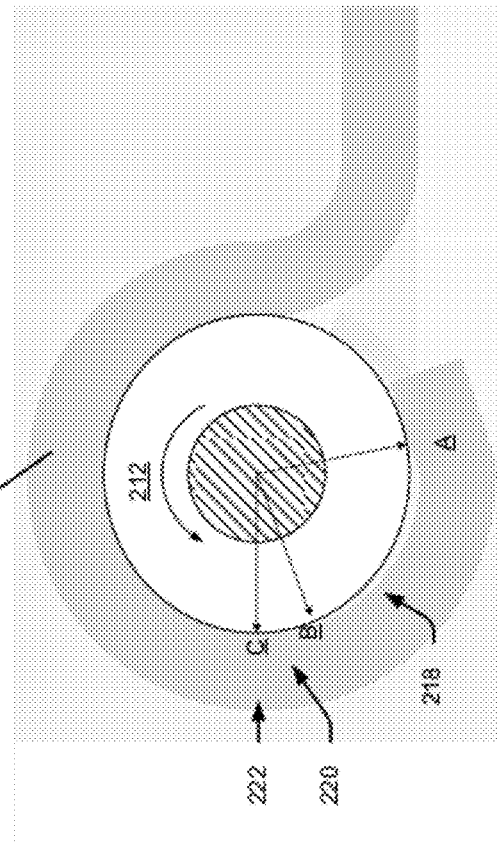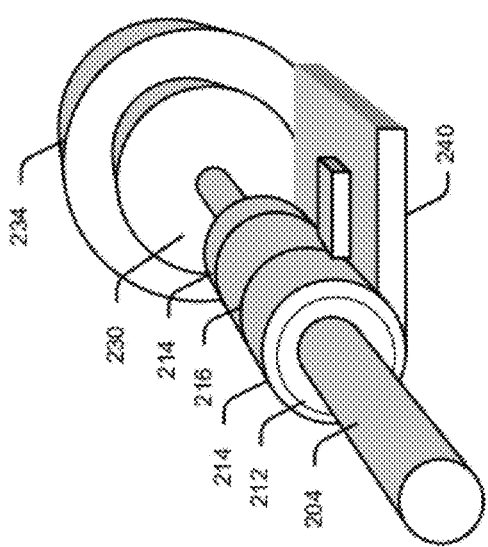

AUTOMATIC HINGE OPENING ASSEMBLY FOR ELECTRONIC DEVICE

RELATED APPLICATIONS

None.

BACKGROUND

The subject matter described herein relates generally to the field of electronic devices and more particularly to an automatic hinge opening assembly for one or more electronic devices.

Some electronic devices utilize a "clamshell" housing. By way of example, many laptop computers and mobile electronic devices utilize a clamshell housing in which a keyboard is disposed on a first section and a display is disposed on a second section coupled to the first section by a hinge. Accordingly assemblies to automatically open a clamshell housing may find utility.

BRIEF DESCRIPTION OF THE DRAWINGS

The detailed description is described with reference to the accompanying figures.

FIG. 3A is a schematic, cross-sectional front elevation view of a automatic hinge in assembly in accordance with some embodiments.

FIG. 3B is a schematic, perspective view illustration a portion of an automatic hinge opening assembly in accordance with some embodiments.

FIG. 3C is a schematic, cross-sectional side view of a pin assembly in accordance with some embodiments.

DETAILED DESCRIPTION

Described herein are exemplary systems and methods to automatically open electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
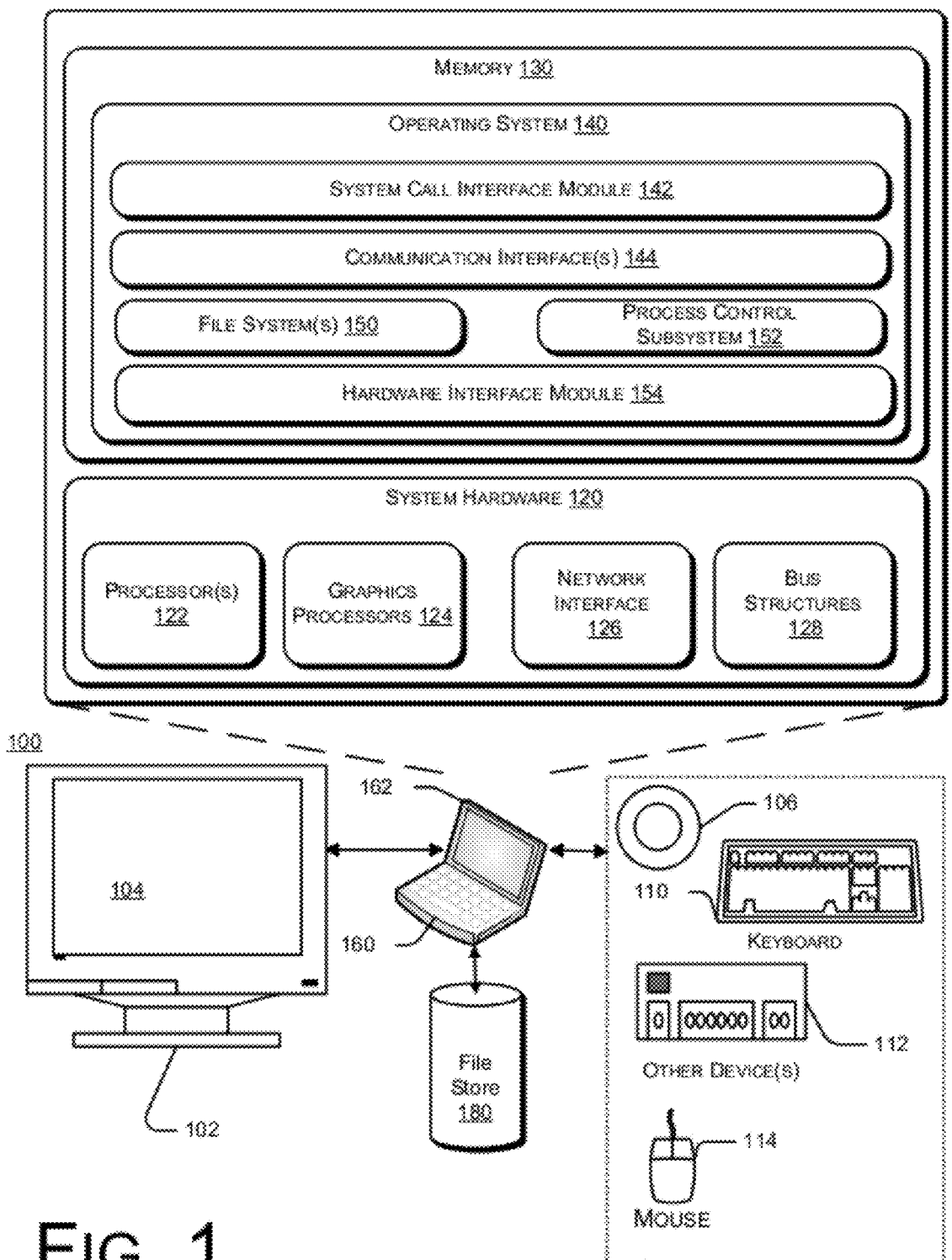
FIG. 1 is a schematic illustration of an exemplary electronic device which may be modified to include an automatic hinge opening assembly in accordance with some embodiments.

FIG. 1 is a schematic illustration of an exemplary electronic device 100 in accordance with some embodiments. In one embodiment, electronic device 100 may include one or more accompanying input/output devices such as one or more speakers 106, a keyboard 110, one or more other I/O device(s) 112, and a mouse 114. The other I/O device(s) 112 may include a touch screen, a voice-activated input device, a track ball, and any other device that allows the electronic device 100 to receive input from a user.

In various embodiments, the electronic device 100 may be embodied as a personal computer, a laptop computer, a personal digital assistant, a mobile telephone, an entertainment device, or another computing device. The electronic device 100 includes system hardware 120 and memory 130, which may be implemented as random access memory and/or read-only memory. A file store 180 may be communicatively coupled to electronic device 100. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some embodiments one of the processors 122 in system hardware 120 may comprise a low-power embedded processor, referred to herein as a manageability engine (ME). The manageability engine 122 may be implemented as an independent integrated circuit or may be a dedicated portion of a larger processor 122.

Graphics processor(s) 124 may function as adjunct processor that manages graphics and/or video operations. Graphics processor(s) 124 may be integrated onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In one embodiment, electronic device 100, comprises a clamshell body which includes a first section 160, commonly referred to as a base, which houses a keyboard, a motherboard, and other components, and a second section 162 which houses a display. The first section 160 and the second section 162 are connected by a hinge assembly which enables the clamshell body to open and close.

Figure 2:
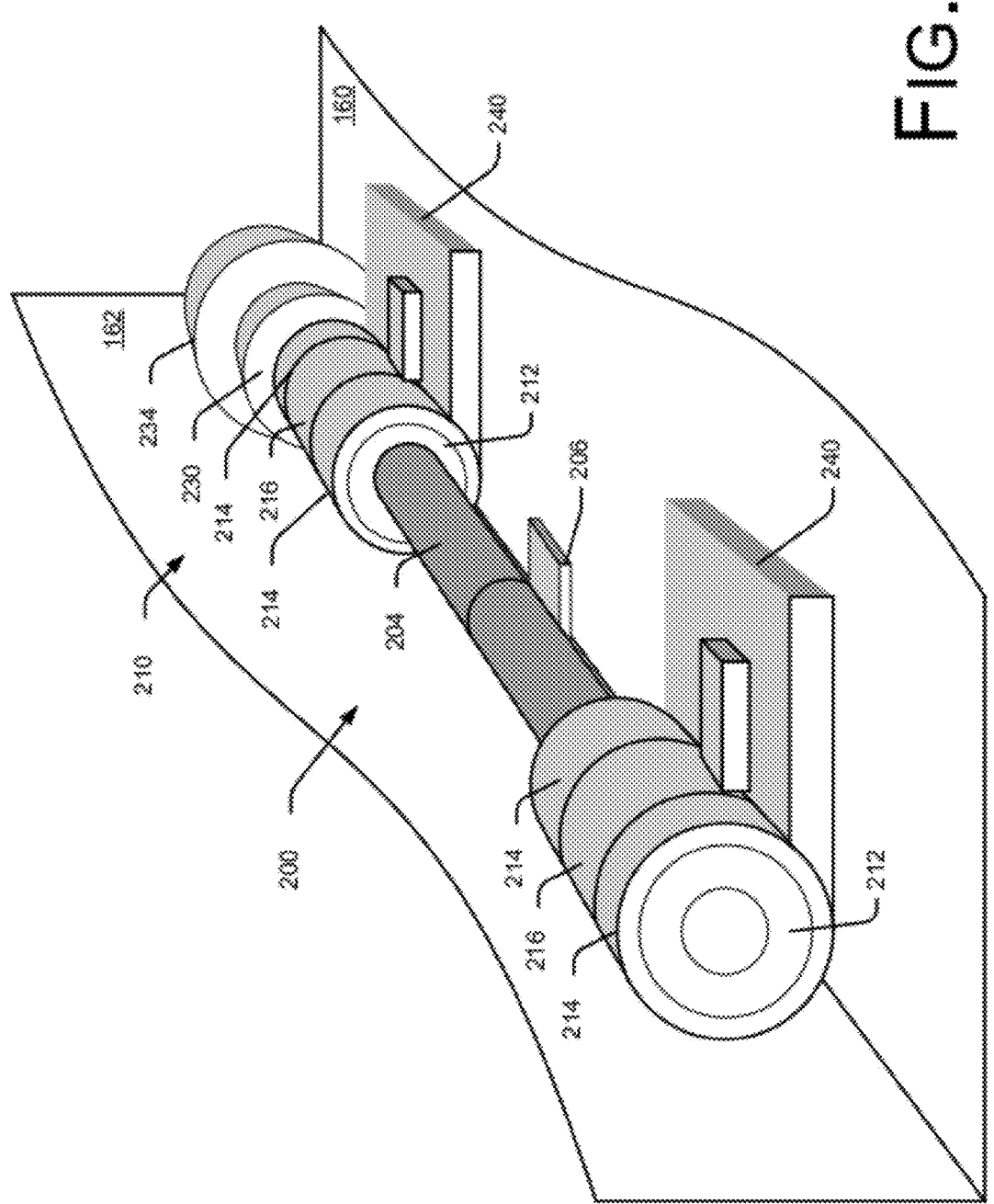
FIG. 2 is a schematic, perspective view illustration of an automatic hinge opening assembly in accordance with some embodiments.

In some embodiments the electronic device 100 may comprise a hinge opening assembly which automatically opens the clamshell body of the electronic device 100. Embodiments of an automatic hinge opening assembly will be described with reference to FIGS. 2 and 3A-3C. FIG. 2 is a schematic, perspective view illustration an automatic hinge opening assembly 200 in accordance with some embodiments. Referring to FIG. 2, in some embodiments an automatic hinge opening assembly 200 comprises at least one hinge pin assembly 210 mountable to a first section 160 of a housing of the electronic device 100. In the embodiment depicted in FIG. 2 the hinge pin assembly 210 comprises a pin 212 rotatable about a longitudinal axis between a first position and a second position and a hinge plate 230 coupled to the pin 212 and connectable to an arm 234 which connects the first section 160 of the housing to a second section 162 of the housing. At least one torsion member 204 is coupled to the pin 212 to apply a torque to the pin 212, such that the torsion member 204 stores potential energy when the first section 160 of the housing and the second section 162 of the housing are in a closed position.

In greater detail, referring to FIG. 2 and FIGS. 3A-3C, the automatic hinge opening assembly 200 is a two-part assembly which is substantially symmetrical about a vertical plane extending through the center of the torsion member 204. The description of the assembly 200 will focus on the components on the right-hand side of the assembly with the understanding that the left-hand side includes the same components. It is noted that some of the components on the left-hand side have been omitted in order not to obscure the drawing.

The hinge pin assembly 210 may be mounted to the first section 160 of the housing by a base plate 240. The base plate 240 may be formed from a suitable metal or polymeric material and secured to the first section 160 of the housing using an adhesive or by suitable fasteners, e.g., by set screws, rivets, or the like. The particular technique of securing the base plate 240 to the first section 160 of the housing is not critical.

As shown best in FIGS. 3A and 3B, the hinge pin assembly 210 is a multi-part component and comprises a bearing section 214 to support the pin 212. The pin 212 is able to rotate about its longitudinal axis within the bearing section 214. A brake section 216 serves to limit the free angular rotation of the pin within the bearing section 214, but allows the pin to rotate further by overcoming a friction force in order to adjust the relative position of the sections of the housing. The bearing section 214 extends on both sides of the brake section 216.

The bearing section 214 and the brake section 216 define a shaft into which the pin 212 is place. The pin 212, in turn, defines an interior shaft through which the torsion member 204 extends.

In the embodiment depicted in FIGS. 2 and 3A-3C the torsion member 204 is implemented as a torsion rod, i.e., a rigid metal rod. One skilled in the art will recognize that the torsion bar could be implemented as a single member, rather than two separate members. In some embodiments the torsion rod 204 measures between 0.5 and 3.5 millimeters in diameter. The torsion rod 204 extends through the shaft in the pin 212, where it is held in fixed relation to the pin by suitable fasteners, e.g., by set screws, rivets, or the like. The particular technique of securing the torsion rod 204 within the pin 212 is not critical.

The brake section 216 is illustrated in greater detail in FIG. 3C, which is a cross-sectional side view of the hinge pin assembly 210 taken through the brake section 216. As described above, the pin 212 is able to rotate about its longitudinal axis within the hinge pin assembly 210. The brake section includes a brake member 216 which mounts to the base plate 240 (see FIG. 3B) and wraps around the pin 212. The brake 216 is shaped in an arc, the interior diameter of which defines a free section 218 through which the pin 218 can rotate freely without interference from the brake 216. In the embodiment depicted in FIG. 3C the free section defines the angular rotation between vectors A and B, which measures approximately 80 degrees. The interior diameter of the brake 216 further defines a resistance section 220 through which the pin can rate with increasing interference. In the embodiment depicted in FIG. 3C the resistance section 220 defines the angular rotation between vectors B and C, which measures approximately 20 degrees. In the brake section of the assembly the pin 212 has a slightly variable radius which defines a stop section 222 which stops the free rotation of the pin 212, after which point it can further rotation by applying manual force. In the embodiment depicted in FIG. 3C the stop section 222 corresponds to point C. It will be appreciated that the specific angular rotation measurements are not critical. The brake 216 may be adapted to allow different angular ranges of rotation, interference, and a different stop point.

The hinge plate 230 is coupled to the torsion bar 204, as best illustrated in FIGS. 3A and 3B. In some embodiments the hinge plate 230 is a cylindrical disk that is fixedly mounted on the torsion bar 204 such that the hinge plate 230 rotates in unison with the torsion bar 204. Hinge plate 230 may be secured to a arm 234 by suitable fasteners, e.g., by screws, rivets, adhesive, or the like. The particular technique of securing the hinge plate 230 to the arm 234 is not critical. The arm 234 is, in turn, connected to the second section 162 of the housing.

In the embodiment depicted in FIG. 2 and FIGS. 3A-3C the torsion bar 204 is secured to the first section 160 approximately at the mid-point along the longitudinal axis of the automatic hinge opening assembly 200. As best illustrated in FIG. 3C, the torsion rod 204 may be secured to the first section 160 of the housing by a pin 208 and bracket 206 assembly, e.g., by a set screw that screws into the base and holds down legs that are bent into the torsion bar. The end of torsion bar 204 which is secured to the pin 208 and bracket 206 assembly cannot rotate about the longitudinal axis of the torsion bar 204.

As best illustrated in FIG. 3A, the left-hand side of the assembly 200 is essentially a mirror image of the right-hand side. Thus, the automatic hinge opening assembly 200 illustrated in FIGS. 2A-3C provides two torsion rods secured at the pin 208 and bracket 206 assembly and secured ultimately to hinges 234 at the opposing end. The torsion rods 204 extend through the pin assemblies 210 and are rotatable about their respective longitudinal axes at the respective hinges 234. Thus, rotating the respective hinges 234 generates a torque force in the torsion rods 204.

Having described details of the construction of automatic hinge opening assembly 200, attention will now be turned to the operation of the assembly 200. In some embodiments the assembly may be mounted onto the first section 160 of the housing by securing the mounting brackets 240 to the first section 160 of the housing. The hinge plates 230 may be secured to the hinges 234. In some embodiments the hinge plates may be secured to the hinges 234 with the second section 162 of the housing disposed at approximately a ninety (90) degree angle with respect to the first section 160 of the housing, such that the torsion bars 204 are not under stress when the second section 162 of the housing is substantially perpendicular to the first section 160 of the housing, i.e., when the clamshell housing is open.

When the clamshell is closed, i.e., when the second section 162 of the housing is rotated such that it is parallel to the first section 162 of the housing, the torsion bars are twisted along their respective longitudinal axes, which generates a torque force in the the torsion bars 204. The torsion bars 204 can store the energy generated by the torque derived from rotating the torsion bars about their respective longitudinal axes. This energy can be released and used to automatically open the clamshell.

In some embodiments the electronic device 100 may comprise an actuator assembly which serves to secure the clamshell in a closed position, thereby storing the potential energy in the torsion rods, and to selectively release the energy when the actuator assembly is activated. FIGS. 4A-4D are schematic illustrations of actuator assemblies, in accordance with some embodiments.

Figure 4A:
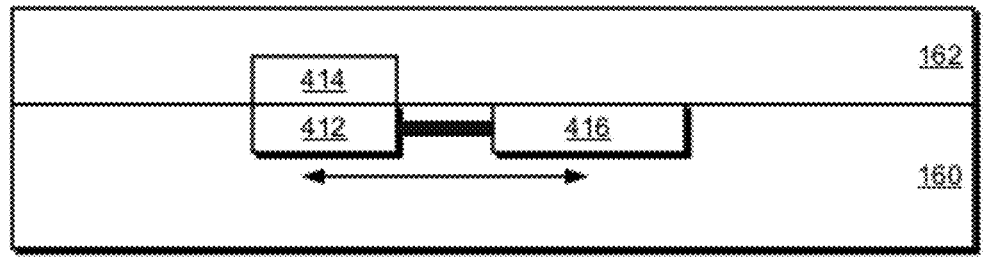
FIGS. 4A-4D are schematic illustrations of actuator assemblies, in accordance with some embodiments.

Referring first to FIG. 4A, in one embodiment the actuator assembly includes a first permanent magnet 412 disposed on the first section 160 of the housing and a second magnet 414 disposed on the second section 162 of the housing. The magnets 412, 414 are positioned such that their opposite poles are facing each other so the magnets attract one another. A physical slide 416 is coupled to the first magnet 412 by a connecting rod 418. In operation, when the clamshell is closed such that the first section 160 and the second section 162 of the housing are adjacent one another the attractive force of the magnets 412, 414 holds the clamshell closed, thereby storing the potential energy in the torsion rods 204. When the physical slide is moved to the left the first magnet 412 is displaced from the second magnet 414, whereupon the potential energy in the torsion rods 402 automatically opens the clamshell. Referring briefly again to FIG. 3C, the second section 162 will rotate freely through the angular rotation between vectors A and B. When the second section 162 reaches point B physical interference (i.e., friction) causes the rotation to slow. When the second section 162 reaches point C the brake 216 causes the rotation to stop.

Figure 4B:
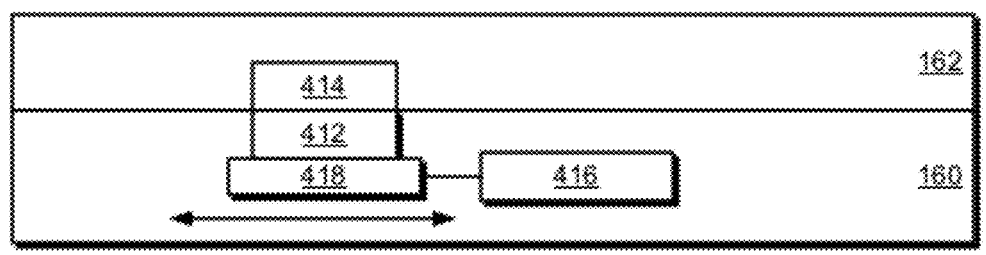
Figure 4C:
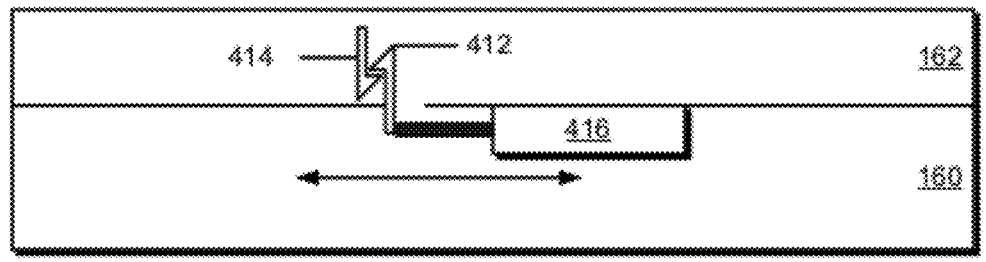
Figure 4D:
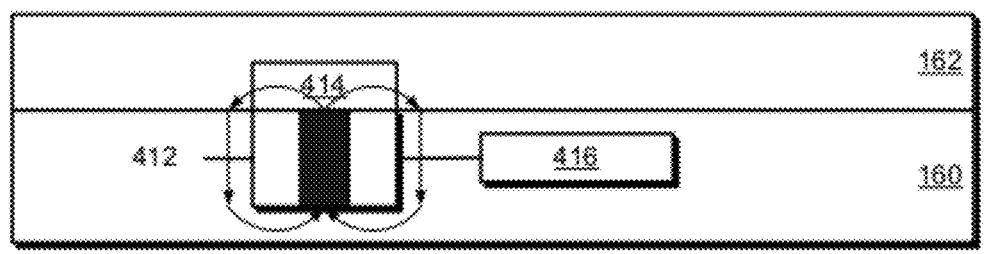

FIGS. 4B-4D are schematic illustrations of alternate implementations of actuator assemblies, in accordance with embodiments. The embodiment depicted in FIG. 4B also uses first and second magnets 412, 414, but utilizes an electrical actuator 418 driven by a switch 416 to slide the first magnet 412 away from the second magnet 414. The actuator 418 may be powered by battery power from a battery coupled to the electronic device. The embodiment depicted in FIG. 4C utilizes a hook and latch mechanism to physically connect the first section 160 and the second section 162 of the housing. A slide 416 physically disengages the hook 412 from the latch 414, which allows the assembly to open. The embodiment depicted in FIG. 4C uses an electrical coil 412 to generate a magnetic force to attract the magnet 414. When the electrical coil is deactivated the magnet 414 is released, allowing the clamshell to open.

The embodiment described with reference to FIGS. 2 and 3A-3C utilizes a torsion bar to store potential energy which is subsequently used to automatically open the clamshell of the electronic device. In alternate embodiments different structures may be used to drive the hinges to open the clamshell. By way of example, in some embodiments the assembly 200 may be replaced by a torsion spring which may be mounted within or proximate one or more of the hinges 234. In further embodiments the assembly 200 may be replaced by an electrical motor, e.g., a servo motor, to drive one or more of the hinges 234. One skilled in the art will recognize that other means for biasing or driving the hinges may be used.

Figure 5:
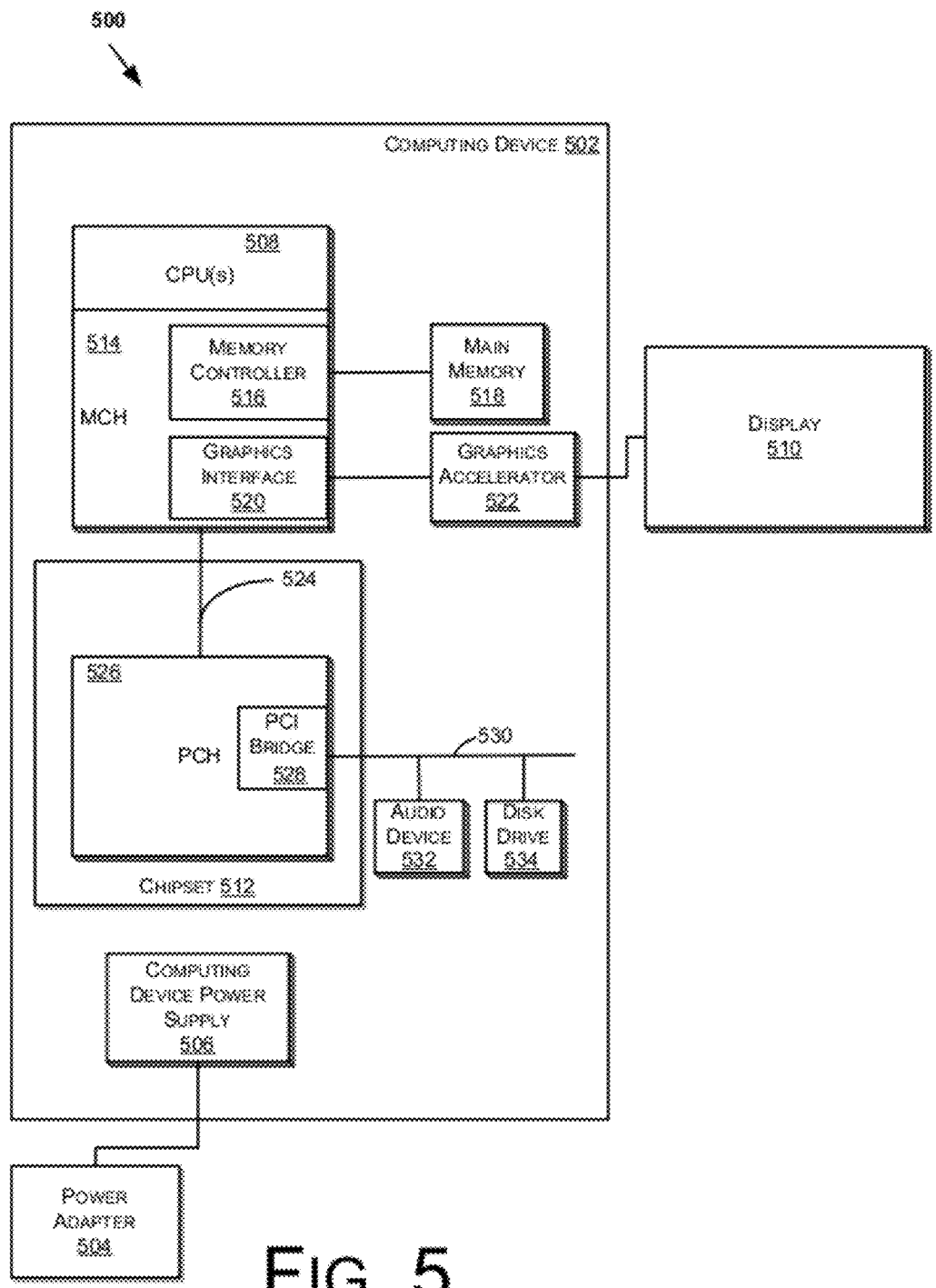
FIG. 5 is a schematic illustration of an electronic device which may be adapted to be locked, according to an embodiment.

As described above, in some embodiments the electronic device may be embodied as a computer system. FIG. 5 is a schematic illustration of a computer system 500 in accordance with some embodiments. The computer system 500 includes a computing device 502 and a power adapter 504 (e.g., to supply electrical power to the computing device 502). The computing device 502 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 502 (e.g., through a computing device power supply 506) from one or more of the following sources: one or more battery packs, an alternating current (AC) outlet (e.g., through a transformer and/or adaptor such as a power adapter 504), automotive power supplies, airplane power supplies, and the like. In some embodiments, the power adapter 504 may transform the power supply source output (e.g., the AC outlet voltage of about 110 VAC to 240 VAC) to a direct current (DC) voltage ranging between about 5 VDC to 12.6 VDC. Accordingly, the power adapter 504 may be an AC/DC adapter.

The computing device 502 may also include one or more central processing unit(s) (CPUs) 508. In some embodiments, the CPU 508 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 512 may be coupled to, or integrated with, CPU 508. The chipset 512 may include a memory control hub (MCH) 514. The MCH 514 may include a memory controller 516 that is coupled to a main system memory 518. The main system memory 518 stores data and sequences of instructions that are executed by the CPU 508, or any other device included in the system 500. In some embodiments, the main system memory 518 includes random access memory (RAM); however, the main system memory 518 may be implemented using other memory types such as dynamic RAM (DRAM), synchronous DRAM (SDRAM), and the like. Additional devices may also be coupled to the bus 510, such as multiple CPUs and/or multiple system memories.

The MCH 514 may also include a graphics interface 520 coupled to a graphics accelerator 522. In some embodiments, the graphics interface 520 is coupled to the graphics accelerator 522 via an accelerated graphics port (AGP). In some embodiments, a display (such as a flat panel display) 540 may be coupled to the graphics interface 520 through, for example, a signal converter that translates a digital representation of an image stored in a storage device such as video memory or system memory into display signals that are interpreted and displayed by the display. The display 540 signals produced by the display device may pass through various control devices before being interpreted by and subsequently displayed on the display.

A hub interface 524 couples the MCH 514 to an platform control hub (PCH) 526. The PCH 526 provides an interface to input/output (I/O) devices coupled to the computer system 500. The PCH 526 may be coupled to a peripheral component interconnect (PCI) bus. Hence, the PCH 526 includes a PCI bridge 528 that provides an interface to a PCI bus 530. The PCI bridge 528 provides a data path between the CPU 508 and peripheral devices. Additionally, other types of I/O interconnect topologies may be utilized such as the PCI Express™ architecture, available through Intel® Corporation of Santa Clara, Calif.

The PCI bus 530 may be coupled to an audio device 532 and one or more disk drive(s) 534. Other devices may be coupled to the PCI bus 530. In addition, the CPU 508 and the MCH 514 may be combined to form a single chip. Furthermore, the graphics accelerator 522 may be included within the MCH 514 in other embodiments.

Additionally, other peripherals coupled to the PCH 526 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 502 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An automatic hinge opening assembly for an electronic device, comprising:
    at least one hinge pin assembly mountable to a first section of a housing of the electronic device and comprising:
        a pin rotatable about an axis between a first position and a second position, wherein the pin has a variable radius; and
        a hinge plate coupled to the pin and connectable to an arm which connects the first section of the housing to a second section of the housing;
        a bearing section to support the pin; and
        a brake section in which the pin has a variable radius to define a stop section which stops the free rotation of the pin;
    wherein the hinge pin assembly is mountable to the first section of the housing by a base plate;
    at least one torsion member coupled to the pin to apply a torque to the pin, wherein the torsion member is to store potential energy when the first section of the housing and the second section of the housing are in a closed position.

2. The automatic hinge opening assembly of claim 1, wherein the brake section comprises:
    a free section through which the pin can rotate with minimal frictional engagement between the brake section and the pin;
    a resistance section through which the pin can rate rotate with increasing frictional engagement between the brake section and the pin; and
    a stop section to stop the angular rotation of the pin.

3. The automatic hinge opening assembly of claim 1, wherein:
the at least one torsion member comprises a torsion rod; and
the pin comprises a shaft to receive the torsion rod.

4. The automatic hinge opening assembly of claim 1, wherein:
the at least one torsion member comprises a torsion spring; and
the pin comprises connector to couple to the torsion spring.

5. The automatic hinge opening assembly of claim 1, wherein:
the at least one torsion member comprises an electric motor; and
the pin comprises connector to couple to the electric motor.

6. The automatic hinge opening assembly of claim 1, wherein:
the at least one torsion member is to store potential energy when the first section of the housing and the second section of the housing are brought together to close the housing.

7. The automatic hinge opening assembly of claim 1, further comprising an actuator assembly to actuate the automatic hinge opening assembly.

8. The automatic hinge opening assembly of claim 7, wherein the actuator assembly comprises:
a first magnet coupled to the first section of the housing; and
a second magnet coupled to the second section of the housing and positioned adjacent to the first magnet when the housing is closed.

9. The automatic hinge opening assembly of claim 1, wherein the variable frictional engagement between the pin and the brake section results from physical interference between portions of the pin having the slightly variable radius and the brake section.

10. An electronic device, comprising:
a housing having a first section comprising a display and a second section comprising a keyboard coupled to the first section by a hinge assembly; and
an automatic hinge opening assembly for the housing, comprising:
a hinge pin assembly mountable to the first section of the housing of the electronic device and comprising:
a pin rotatable about an axis between a first position and a second position, wherein the pin has a slightly variable radius; and
a hinge plate coupled to the pin and connectable to a hinge which connects the first section of the housing to a second section of the housing;
a bearing section to support the pin; and
a brake section in which the pin has a variable radius to define a stop section which stops the free rotation of the pin;
wherein the hinge pin assembly is mountable to the first section of the housing by a base plate;
at least one torsion member coupled to the pin to apply a torque to the pin, wherein the torsion member is to store potential energy when the first section of the housing and the second section of the housing are in a closed position.

11. The electronic device of claim 10, wherein the brake section comprises:
a free section through which the pin can rotate with minimal frictional engagement between the brake section and the pin;
a resistance section through which the pin can rate rotate with increasing frictional engagement between the brake section and the pin; and
a stop section to stop the angular rotation of the pin.

12. The electronic device of claim 10, wherein:
the at least one torsion member comprises a torsion rod; and
the pin comprises a shaft to receive the torsion rod.

13. The electronic device of claim 10, wherein:
the at least one torsion member comprises a torsion spring; and
the pin comprises connector to couple to the torsion spring.

14. The electronic device of claim 10, wherein:
the at least one torsion member comprises an electric motor; and
the pin comprises connector to couple to the electric motor.

15. The electronic device of claim 10, wherein:
the torsion member stores potential energy when the first section of the housing and the second section of the housing are brought together to close the housing.

16. The electronic device of claim 10, further comprising an actuator assembly to actuate the automatic hinge opening assembly.

17. The electronic device of claim 16, wherein the actuator assembly comprises:
a first magnet connected to the first section of the housing;
a second magnet connected to the second section of the housing and positioned adjacent to the first magnet when the housing is closed.

18. The electronic device of claim 10, wherein the variable frictional engagement between the pin and the brake section results from physical interference between portions of the pin having the slightly variable radius and the brake section.

* * * * *